(12) United States Patent
Prenninger et al.

(10) Patent No.: US 9,040,207 B2
(45) Date of Patent: May 26, 2015

(54) METHOD FOR OPERATING A HIGH-TEMPERATURE FUEL CELL

(75) Inventors: Peter Prenninger, Graz (AT); Juergen Rechberger, Graz (AT)

(73) Assignee: AVL LIST GMBH, Graz (AT)

( * ) Notice: Subject to any disclaimer, the term of this patent is extended or adjusted under 35 U.S.C. 154(b) by 515 days.

(21) Appl. No.: 13/375,371

(22) PCT Filed: Jul. 15, 2010

(86) PCT No.: PCT/EP2010/060214
§ 371 (c)(1),
(2), (4) Date: Jan. 6, 2012

(87) PCT Pub. No.: WO2011/006964
PCT Pub. Date: Jan. 20, 2011

(65) Prior Publication Data
US 2012/0100447 A1    Apr. 26, 2012

(30) Foreign Application Priority Data
Jul. 16, 2009  (AT) ................. A 1115/2009

(51) Int. Cl.
| | |
|---|---|
| H01M 2/38 | (2006.01) |
| H01M 2/40 | (2006.01) |
| H01M 8/24 | (2006.01) |
| H01M 8/04 | (2006.01) |
| H01M 8/06 | (2006.01) |
| H01M 8/12 | (2006.01) |

(52) U.S. Cl.
CPC ...... *H01M 8/04097* (2013.01); *H01M 8/04111* (2013.01); *H01M 8/04231* (2013.01); *H01M 8/0618* (2013.01); *H01M 2008/1293* (2013.01); *Y02E 60/50* (2013.01); *Y02E 60/525* (2013.01)

(58) Field of Classification Search
USPC ........................................ 429/454, 455, 429
IPC ..................... H01M 8/04097,8/04111, 8/04425
See application file for complete search history.

(56) References Cited

U.S. PATENT DOCUMENTS

| | | | |
|---|---|---|---|
| 6,358,638 B1 * | 3/2002 | Rock et al. ................ | 429/429 |
| 6,660,416 B2 | 12/2003 | Sederquist et al. | |
| 7,432,004 B2 | 10/2008 | Ueda et al. | |

(Continued)

FOREIGN PATENT DOCUMENTS

DE         102007033150         1/2009

OTHER PUBLICATIONS

English Abstract of DE102007033150.

*Primary Examiner* — Patrick Ryan
*Assistant Examiner* — Julian Anthony
(74) *Attorney, Agent, or Firm* — Dykema Gossett PLLC

(57) ABSTRACT

In a method for operating a high-temperature fuel cell, which in normal mode of generating electrical power is supplied with liquid fuel, preferably diesel oil, and is preceded on the anode side by a reformer for liquid fuel, where at least part of the hot anode exhaust gas is recirculated into the anode circuit via a recirculation line. Upstream of a compressor preceding the reformer the liquid fuel is sprayed or injected into the hot anode exhaust gas, the quantity of air needed for reforming the liquid fuel being added to the mixture of anode exhaust gas and fuel. On change-over from normal operational mode to standby mode without power generation, the supply of liquid fuel and air is stopped and the gas mixture present in the anode circuit be permanently circulated. A defined amount of air being introduced into the anode circuit in order to remove deposits and contaminations in the high-temperature fuel cell following standby operation.

11 Claims, 2 Drawing Sheets

(56) References Cited

U.S. PATENT DOCUMENTS

| | | |
|---|---|---|
| 7,704,617 B2 | 4/2010 | Venkataraman |
| 7,901,820 B2 * | 3/2011 | Mergler et al. ............ 429/423 |
| 2008/0182141 A1 | 7/2008 | Rechberger et al. |

* cited by examiner

METHOD FOR OPERATING A HIGH-TEMPERATURE FUEL CELL

BACKGROUND OF THE INVENTION

1. Field of The Invention

The invention relates to a method for operating a high-temperature fuel cell, which in normal mode of generating electrical power is supplied with liquid fuel, preferably diesel oil, and is preceded by a reformer for Liquid fuel on the anode side, where at least part of the hot anode exhaust gas is recirculated into the anode circuit via a recirculation line, and where upstream of a compressor preceding the reformer the liquid fuel is sprayed or injected into the hot anode exhaust gas, the quantity of air needed for reforming the liquid fuel being added to the mixture of anode exhaust gas and fuel.

1. The Prior Art

A high-temperature fuel cell, for instance a solid-oxide fuel cell (SOFC) with an anode circuit for recirculating water for the reformer process, and a method for operating a fuel cell of this kind, are disclosed in AT 502.130 B1, for instance, This method permits operation of fuel cells without the supply of additional external water. Water is required for endothermal steam reforming of hydrocarbons. If liquid hydrocarbons such as gasoline or diesel are used, the reformer process can be substantially improved by means of the recirculated water and the operating temperature can be lowered.

The operational profiles of SOFC systems differ according to application. In stationary applications the systems are permanently operational. In mobile applications, for instance in auxiliary power units (APU) of heavy duty trucks, the systems are operational only part of the time and must be kept at a certain temperature for the rest of the time. This phase, during which no current is generated, is highly critical, since the anode of the SOFC must be kept in a reducing environment (with fuel), but no water for reforming is available. This same problem arises not only in standby operation but also during start-up and shut-down of the fuel cell.

Deposits and contaminations in the reformer and the fuel cell, which occur during normal operation, present yet another problem.

If a SOFC system is run on hydrocarbons, there will inevitably occur deposits and contaminations in the reformer and also at the anode of the SOFC, which will degrade the performance of the SOFC and the reformer. The most important deposits and contaminates are carbon, which arises due to the thermodynamics of chemical equilibrium depending on temperature, and sulphur, which is contained in the fuel, and higher hydrocarbons, which were not completely cracked in the reformer. All of these substances form deposits on catalytic functional layers in the reformer or on the SOFC anode and thus cover active surfaces, which will result in power loss. In addition, these deposits can embed themselves in ceramic layers, changing the structure and composition of material. Since the generation of the substances cannot completely be avoided, the problem primarily is that of removing them from the system.

From DE 10 2007 033 150 A1 a fuel cell system is known which is used for power generation in an automotive vehicle. The fuel cell system comprises a reformer, which generates a combustion gas from a fuel containing hydrogen (e.g. diesel) and from an oxidator furnishing oxygen (e.g. air), and at least one fuel cell, which is supplied with combustion gas at the anode and with air as cathode gas, for instance. During normal operation the reformer is fed fuel and oxidator. During regeneration operation the reformer is initially only fed anode exhaust gas coming from the fuel cell, and if later on an oxidator is added care should be taken that no oxygen enters the anode side of the fuel cell.

It is an object of the present invention to improve a method of operating a high-temperature fuel cell in such a way that the deficiencies described above will be avoided during standby operation, while the problem of removing unavoidable deposits and contaminations of the fuel cell will also be solved.

SUMMARY OF THE INVENTION

According to the invention this object is attained by providing that on changeover from normal operation to standby without power generation, the feeding of liquid fuel and air is stopped and that the gas mixture present in the anode circuit is permanently circulated, and that furthermore with the start of standby operation, a defined amount of air is fed to the anode circuit in order to remove deposits and contaminations in the high-temperature fuel cell.

Unlike the method of DE 10 2007 033 150 A1, the anode of the fuel cell is supplied with oxygen, the supplied amount of air being determined such that after oxidation of the fuel components present in the circuit, an oxygen content of 0.5-10 percent by volume is obtained in the anode circuit.

When the high-temperature fuel cell is in normal operation and produces electrical energy, part of the water arising is permanently circulated in the anode circuit. Typically, about 5% to 50% of the anode exhaust gas is thereby recirculated. This will result in a partial water content of 5% to 20% in the circuit. If the system changes to standby operation current generation is stopped and up to 100% of the anode exhaust gas is recirculated by the pump in the circuit.

According to a variant of the invention the anode circuit may be closed on the outlet side during standby operation to avoid the sucking in of media, such as ambient air.

The deposits present in the system, such as carbon, sulphur and higher hydrocarbons can very effectively be oxidized with oxygen and can thus be removed from the system, but care must be taken that the anode of the SOFC is not irreversibly destroyed by this cleaning method. A suitable design, for instance a cell approach, will solve the problem.

The cleaning method described is for instance suitable for ESC systems (Electrolyte Supported Cells) where the electrolyte layer is the supporting structure of the fuel cell. The cells are oxygen-stable to a certain degree, since they have only a very thin anode layer, which is oxidized by oxygen.

Even more suitable are MSC systems (Metal Supported Cells), where the supporting structure is a porous metal plate, onto which are applied extremely thin ceramic layers (anode, electrolyte, cathode). Substantial oxygen stability is to be expected from this kind of cell. The anode is completely oxidized, but can be reduced again without being destroyed.

To remove deposits and contaminations from the high-temperature fuel cell, for instance an MSC-cell, it is possible according to a variant of the invention, to close the recirculation line for the anode exhaust gas and to flush the anode of the high-temperature fuel cell together with the upstream reformer directly with air.

The invention will now be described in more detail with reference to the enclosed schematic drawings.

DETAILED DESCRIPTION OF THE PREFERRED EMBODIMENTS

Figure 1:
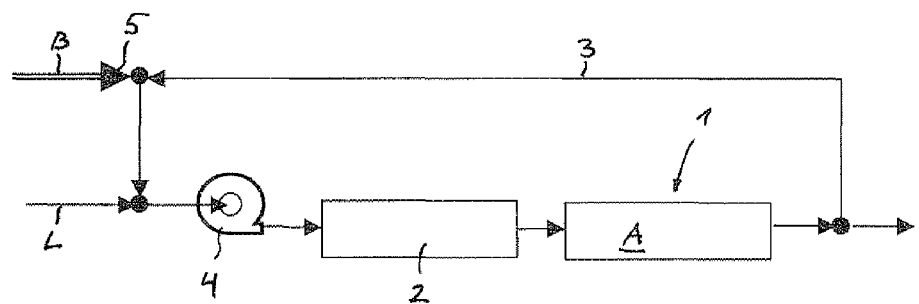
FIG. 1 a state-of-the-art set-up for operating a high-temperature fuel cell in normal operation.

The set-up for operating a high-temperature fuel cell as schematically shown in FIG. 1, is known from AT 502.130 B1 cited above. The device comprises a high-temperature fuel cell 1, or a stack of fuel cells, of which only the anode A is shown to simplify presentation. The fuel cell is operated on liquid fuel B (liquid hydrocarbon, e.g., diesel), which is supplied to the anode A via an upstream reformer 2. Furthermore, there is provided a recirculation line 3 for the hot anode exhaust gas, which departs from the outlet side of the anode A of the high-temperature fuel cell and connects to the inlet side of the reformer 2. Upstream of a compressor 4 (e.g., a pump) preceding the reformer 2 an injector 5 is provided for spraying or injecting the liquid fuel B into the hot anode exhaust gas. The air volume L needed for reforming the liquid fuel B is added to the mixture of anode exhaust gas and fuel upstream of the compressor 4.

Figure 2:
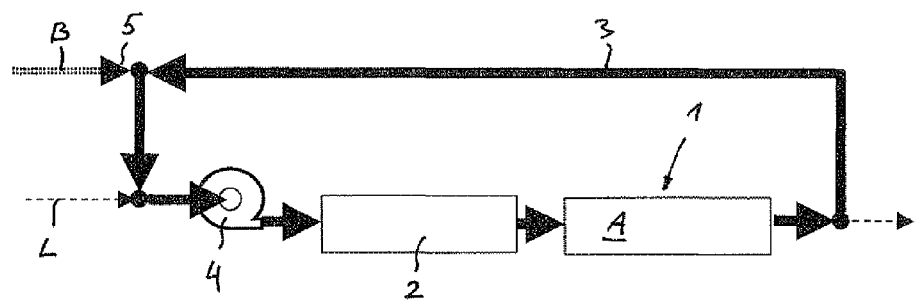
FIG. 2 to FIG. 6 different operational states of the method according to the invention for operating a high-temperature fuel cell using a set-up as shown in FIG. 1.
Figure 3:
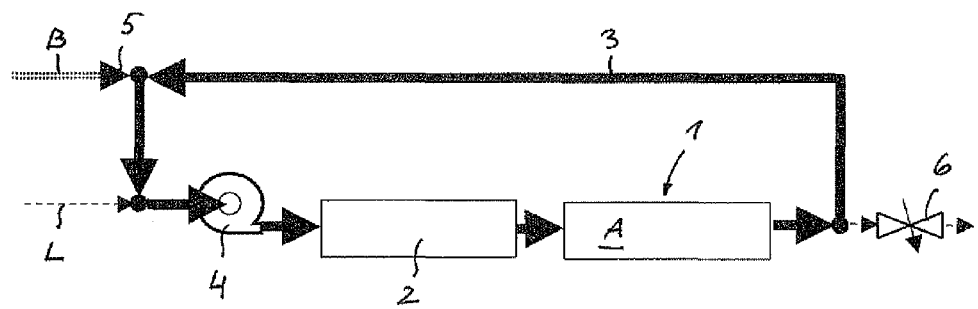
Figure 4:
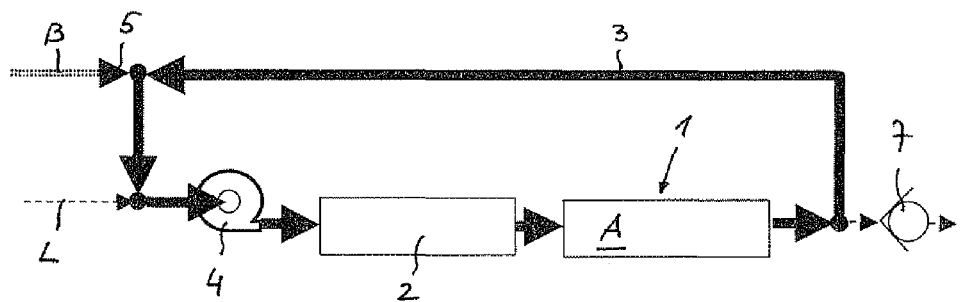

In FIGS. 2 to 4 there is shown the standby operational mode of the method of the invention, in which power generation and the supplying of liquid fuel B and air L has been stopped (indicated by broken lines) and the gas mixture present in the anode circuit 3 is permanently circulated (full line). Thus no media (diesel fuel, air) are fed into the system and no anode exhaust gas is expelled. The prevailing partial water content is kept constant and the fuel or combustion gas still present in the circuit (under a reducing environment) is fed to the anode A. Carbon formation can effectively be suppressed by the water content of the gas mixture. The standby operational mode shown in FIGS. 2 to 4 may also be advantageously applied during shut-down of the system. In this case the gas mixture (up to 100%) in the anode circuit is circulated without inflow of media (air, fuel) and the system is cooled (actively or passively). The anode circuit is switched off only after the stack temperature has dropped below approximately 300° C.

In the variants shown in FIG. 3 and FIG. 4 the outlet of the anode circuit has been provided with a valve 6 or a check valve 7 to avoid uncontrolled sucking in of ambient air via the outlet of the anode A.

Figure 5:
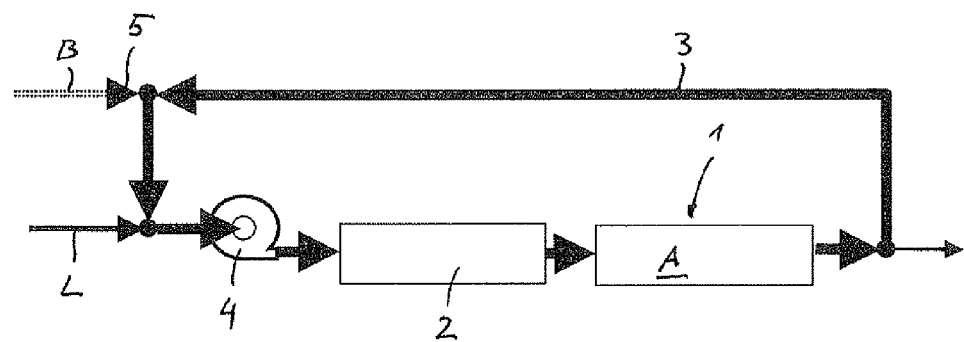

Following standby operation with the anode circuit running in the closed mode (as described in FIGS. 2 to 4), deposits and contaminations can be removed by introducing a defined amount of air L into the circuit with a corresponding partial volume of exhaust gas being vented at the anode outlet (see FIG. 5). As long as fuel components ($H_2$, CO) are present in the circuit, these are oxidized in the reformer by the oxygen supplied in the air. Only after the removal of all fuel components from the circuit a stable oxygen proportion will be established in the circuit. This proportion can optionally be set at 0.5-10.0 per cent by volume. The oxygen will now react with the deposits and oxidize them. The oxidized deposits can escape from the surface and enter the anode circuit in the form of $CO_2$, $SO_2$, $H_2O$ etc. The catalytic surface will thus very efficiently be freed from deposits and the initial performance of the fuel cell 1 will be reestablished.

Figure 6:
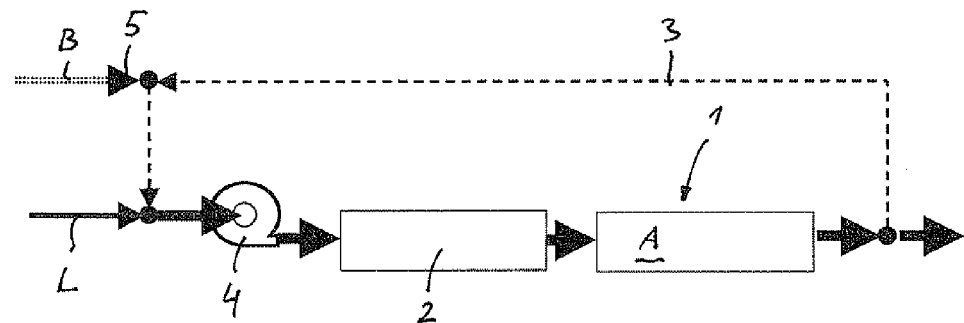

In FIG. 6 a special variant of this cleaning procedure is shown. If a very robust SOFC stack technology is given, for instance in the case of MSC systems (Metal Supported Cells), air L may be directly supplied to the anode path comprising the reformer 2. Here the recirculation line 3 is shut down (not absolutely necessary) and the reformer 2 as well as the anode A of the fuel cell 1 are fed air only. As described above this will oxidize all deposits and contaminations and remove them from the system.

The invention claimed is:

1. A method for operating a high-temperature fuel cell, which in normal operation mode of generating electrical power is supplied with liquid fuel, and is preceded on an anode side by a reformer for the liquid fuel, where at least part of hot anode exhaust gas of the fuel cell is recirculated into an anode circuit via a recirculation line, and where upstream of a compressor preceding the reformer the liquid fuel is sprayed or injected into the hot anode exhaust gas, a quantity of air needed for reforming the liquid fuel being added to the mixture of anode exhaust gas and fuel, wherein on change-over from normal operation mode to standby operation mode without power generation the supply of liquid fuel and air is stopped and the gas mixture present in the anode circuit is permanently circulated, and that—following standby operation mode—a defined amount of air is introduced into the anode circuit for removing deposits and contaminations in the high-temperature fuel cell.

2. The method according to claim 1, wherein the introduced amount of air is determined such that an oxygen content of 0.5 to 10 volume percent is established in the anode circuit after oxidation of fuel components left in the anode circuit.

3. The method according to claim 1, wherein the liquid fuel is diesel oil.

4. The method according to claim 1, wherein an exhaust gas recirculation rate of up to 100% is set during standby operation mode, 5. The method according to claim 1, wherein an exhaust gas recirculation rate of up to 100% is set during shut-down of the fuel cell.

6. The method according to claim 1, wherein the anode circuit is closed on the outlet side during standby operation mode in order to avoid sucking in of ambient air.

7. A method for operating a high-temperature fuel cell, which in normal operation mode of generating electrical power is supplied with liquid fuel, and is preceded on an anode side by a reformer for the liquid fuel, where at least part of hot anode exhaust gas of the fuel cell is recirculated into an anode circuit via a recirculation line, and where upstream of a compressor preceding the reformer the liquid fuel is sprayed or injected into the hot anode exhaust gas, a quantity of air needed for reforming the liquid fuel being added to the mixture of anode exhaust gas and fuel, wherein on change-over from normal operation mode to standby operation mode without power generation the supply of liquid fuel and air is stopped and the gas mixture present in the anode circuit is permanently circulated, and that—following standby operation mode—the recirculation line for the anode exhaust gas is closed and air is directly supplied to the anode circuit upstream of the reformer for removing deposits and contaminations in the high-temperature fuel cell.

8. The method according to claim 7, wherein the liquid fuel is diesel oil.

9. The method according to claim 7, wherein an exhaust gas recirculation rate of up to 100% is set during standby operation mode.

10. The method according to claim 7, wherein an exhaust gas recirculation rate of up to 100% is set during shut-down of the fuel cell.

11. The method according to claim 7, wherein the anode circuit is closed on the outlet side during standby operation mode in order to avoid sucking in of ambient air.

\* \* \* \* \*